United States Patent [19]

Andrews

[11] 4,101,459

[45] Jul. 18, 1978

[54] COMPOSITIONS FOR CURING EPOXIDE RESINS

[75] Inventor: Christopher Michael Andrews, Cambridge, England

[73] Assignee: Ciba-Geigy Corporation, Ardsley, N.Y.

[21] Appl. No.: 734,072

[22] Filed: Oct. 20, 1976

[30] Foreign Application Priority Data

Oct. 23, 1975 [GB] United Kingdom ............... 43497/75

[51] Int. Cl.² ...................... C08G 59/56; C08G 59/68
[52] U.S. Cl. ............................... 260/18 EP; 528/107; 528/231; 528/341; 528/336; 528/109; 528/118; 528/121; 528/124; 528/122; 528/365; 528/407; 528/405; 206/568; 260/18 EP; 260/30.2; 260/30.4 EP; 260/31.8 E; 260/33.2 EP; 260/33.4 G; 260/32.8 EP; 260/47 EC; 260/59 EP; 260/78.3 R; 260/78.41; 260/834

[58] Field of Search .......... 260/47 EC, 47 EN, 2 EC, 260/2 N, 30.2, 18 EP, 30.4 EP, 78.41, 31.8 E, 59 EP, 78.3 R, 834

[56] References Cited

U.S. PATENT DOCUMENTS

| | | | |
|---|---|---|---|
| 3,586,616 | 6/1971 | Kropp | 204/159.11 |
| 3,632,843 | 1/1972 | Allen et al. | 260/2 EC |
| 3,666,721 | 5/1972 | Godfrey | 260/47 EC |
| 3,785,997 | 1/1974 | Godfrey | 252/426 |
| 3,842,019 | 10/1974 | Kropp | 260/2 EP |
| 3,907,706 | 9/1975 | Robins | 252/431 C |

*Primary Examiner*—Harold D. Anderson
*Assistant Examiner*—E. A. Nielsen
*Attorney, Agent, or Firm*—Vincent J. Cavalieri

[57] ABSTRACT

To accelerate the curing of epoxide resins by aromatic, heterocyclic, or cycloaliphatic polyamines there are employed salts of trifluoromethanesulfonic acid.

9 Claims, No Drawings

NEW COMPOSITIONS FOR CURING EPOXIDE RESINS

BACKGROUND OF THE INVENTION

This invention relates to compositions for curing epoxide resins, to curable mixtures of these compositions and epoxide resins, and to cured products obtained by curing the aforesaid mixture.

It is known that epoxide resins, i.e., substances containing on average more than one 1,2-epoxide group per molecule, may be cured by reaction with various classes of substances to form cross-linked, infusible, insoluble products having valuable technical properties. An important class of curing agents comprises aromatic, aliphatic, heterocyclic, and cycloaliphatic polyamines, including aminoamides; by "polyamine" is meant an amine having at least three hydrogen atoms directly attached to amino nitrogen atoms.

The chief drawback with the polyamines at present in use is that they often cure the resin only slowly, particularly when aromatic amines are employed. The use of accelerators alleviates this drawback to some extent but the accelerating effect imparted by those hitherto available is relatively modest.

It is known from British patent specification No. 1,314,561 that salts of trifluoromethanesulfonic acid induce cationic polymerization of epoxide resins on heating the salt and resin together. In general, the reactants were heated at a temperature of from about 50° to 218° C. Gelation at 50° took, according to the Examples, 4 days in one case but in the remaining cases 14, 14, 33, 52, 35, 58, 70, and 49 days. In the experiment carried out at room temperature, the resin-catalyst mixture was still liquid after 1 year. In other experiments, temperatures of 132°, 149°, and 204° C are employed. It can be seen that, at room temperature or a little above, the trifluoromethanesulfonate had a negligible effect on the epoxide resin. Although the use at 132° C of a polycarboxylic acid anhydride as a co-curative is illustrated, it was not to be expected from the disclosures of the aforesaid British patent that a salt of a trifluoromethanesulfonic acid would have the valuable property of strongly accelerating the curing of epoxide resins by certain polyamines, even without the application of heat.

U.S. Pat. No. 3,907,706, a subsequent patent to the same assignee, disclosed latent epoxide resin compositions containing both a metal salt of trifluoromethanesulfonic acid and a thermally decomposable ester reaction product of a tertiary alkyl alcohol and an acid that forms a chelation complex with the metal ion of the metal salt. To retard, if desired, the activity of the catalyst system, there may be included a buffering compound. In the list of suitable buffering agents, an aliphatic polyamine is named. Again, it would not have been expected that a salt of trifluoromethanesulfonic acid would accelerate the curing of epoxide resins by certain polyamines.

We have now found that salts of trifluoromethanesulfonic acid very markedly accelerate the cure of epoxide resins with amines.

DETAILED DISCLOSURE

One aspect of this invention therefore comprises a composition, suitable for use as a curing agent for epoxide resins, comprising (a) an aromatic, heterocyclic, or cycloaliphatic polyamine, and (b) a salt of trifluoromethanesulphonic acid.

Another aspect of this invention comprises a curable composition comprising (a) an aromatic, heterocyclic, or cycloaliphatic polyamine, (b) a salt of trifluoromethanesulfonic acid, and (c) an epoxide resin.

A further aspect of this invention comprises a process for curing an epoxide resin which consists of forming a mixture of the epoxide resin, an effective amount of an aromatic, heterocyclic, or cycloaliphatic polyamine as curing agent therefor, and a salt of trifluoromethanesulfonic acid, and allowing or causing the mixture to cure.

The salt of trifluoromethanesulphonic acid may be those of light or heavy metals, i.e., of metals of Groups IA, IB, IIA, IIB, IIIB, IVB, VB, VIB, VIIB, or VIII of the Periodic Table (as shown on p. 60–61 in Handbook of Chemistry, ed. Lange, Revised Tenth Edition, published by McGraw-Hill). Preferably the metals are mono- or divalent, the lithium, calcium, zinc, cadmium, cobalt, nickel, manganese, and especially the magnesium, salts being particularly preferred.

The salts may also be ammonium salts, including quaternary ammonium salts, or amine salts such as those of aromatic, aliphatic, or heterocyclic amines, preferably those amines having a basic strength, $-\log K_1$, of 5 or less. Typical such amines include mono-, di-, and tri-methylamine, mono-, di-, and tri-ethylamine, ethanolamine, the butylamines, benzylamine, 2-phenylethylamine, N,N-dimethylbenzylamine, ethylenediamine, piperazine, and piperidine.

Epoxide resins which may be employed in these compositions are preferably those containing groups of formula

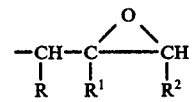

directly attached to atoms of oxygen, nitrogen, or sulphur, where either R and $R^2$ each represent a hydrogen atom, in which case $R^1$ denotes a hydrogen atom or a methyl group, or R and $R^2$ together represent —$CH_2CH_2$—, in which case $R^1$ denotes a hydrogen atom.

As examples of such resins may be mentioned polyglycidyl and poly($\beta$-methylglycidyl) esters obtainable by reaction of a compound containing two or more carboxylic acid groups per molecule with epichlorohydrin, glycerol dichlorohydrin, or $\beta$-methylepichlorohydrin in the presence of an alkali. Such polyglycidyl esters may be derived from aliphatic polycarboxylic acids, e.g., oxalic acid, succinic acid, glutaric acid, adipic acid, pimelic acid, suberic acid, azelaic acid, sebacic acid, dimerised or trimerised linoleic acid, and homopolymers and copolymers of acrylic acid and methacrylic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly($\beta$-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene)-glycols, propane-1,2-diol and poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol, and poly(epichlorohydrin); from cycloaliphatic alcohols such as resorcitol, quinitol, bis(4-hydroxycyclohexyl)methane, 2,2-bis(4-hydroxycyclhexyl)propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamine)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl) sulphone, 1,1,2,2-tetrakis(4-hydroxyphenyl)ethane, 2,2-bis(4-hydroxyphenyl)propane (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert.butylphenol.

Poly(N-glycidyl) compounds include, for example, those obtained by dehydrochlorination of the reaction products of epichlorohydrin with amines containing at least two amino-hydrogen atoms such as aniline, n-butylamine, bis(4-aminophenyl)methane, and bis(4-methylaminophenyl)methane; triglycidyl isocyanurate; and N,N'-diglycidyl derivatives of cyclic alkylene ureas, such as ethyleneurea and 1,3-propyleneurea, and of hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl)ether.

Examples of epoxide resins having groups of formula I where R and $R^2$ conjointly denote a —CH$_2$CH$_2$— group are bis(2,3-epoxycyclopentyl) ether, 2,3-epoxycyclopentyl glycidyl ether, and 1,2-bis(2,3-epoxycyclopentyloxy)ethane.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicylic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

However, epoxide resins in which some or all of the epoxide groups are not terminal may also be employed, such as vinylcyclohexene dioxide, limonene dioxide, dicyclopentadiene dioxide, 4-oxatetracyclo[6,2,1,0$^{2,7}$,0$^{3,5}$]undec-9-yl glycidyl ether, the bis(4-oxatetracyclo[6,2,1,0$^{2,7}$,0$^{3,5}$]undec-9-yl) ether of ethylene glycol, 3,4-epoxycyclohexylmethyl 3',4'-epoxycyclohexanecarboxylate and its 6,6'-dimethyl derivative, the bis(3,4-epoxycyclohexanecarboxylate) of ethylene glycol, 3-(3,4-epoxycyclohexyl)-8,9-epoxy-2,4-dioxaspiro[5,5]undecane, and epoxidized butadienes or copolymers of butadiene with ethylenic compounds such as styrene and vinyl acetate.

If desired, a mixture of epoxide resins may be used.

Preferred epoxide resins are polyglycidyl ethers, polyglycidyl esters, and N,N'-diglycidylhydantoins. Specific examples of such preferred resins are polyglycidyl ethers of 2,2-bis(4-hydroxyphenyl)propane, of bis(4-hydroxyphenyl)methane, or of a novolak formed from formaldehyde and phenol, or phenol substituted in the ring by one chlorine atom or by one alkyl hydrocarbon group containing from one to nine carbon atoms, and having a 1,2-epoxide content of more than 0.5 equivalent per kilogram.

As examples of suitable cycloaliphatic, aromatic, and heterocyclic polyamines may be mentioned m- and p-phenylenediamine, bis(4-aminophenyl)methane, aniline-formaldehyde resins, bis(4-aminophenyl) sulfone, m-xylylenediamine, bis(4-aminocyclohexyl)methane, 2,2-bis(4-aminocyclohexyl)propane, 2,2-bis(4-amino-3-methylcyclohexyl)propane, 3-aminomethyl-3,5,5-trimethylcyclohexylamine (isophoronediamine), N-(2-aminoethyl)piperazine, polyaminoamides prepared from such polyamines and dimerized or trimerized unsaturated fatty acids, and adducts of such polyamines with stoichiometric deficits of polyepoxides such as a diglycidyl ether.

An effective amount of the curing agent is employed. The proportion will depend on the properties sought of the curable composition and its cured product; the optimum proportion can readily be determined by methods familiar to those skilled in the art. By way of illustration, however, there will normally be used from about 0.75 to 1.25 amino-hydrogen equivalents of the polyamine per 1,2-epoxy equivalent of the epoxide resin.

The amount of the accelerator, too, may vary according to such factors as those just mentioned, but usually from 0.2 to 2 parts by weight are employed per 100 parts of the combined weights of the epoxide resin and the curing agent.

The accelerator is best incorporated dissolved in an inert organic solvent such as 2-methoxyethanol, ethylene glycol, diethylene glycol, N-methylpyrrolidone, γ-butyrolactone, benzyl alcohol, dibutyl phthalate, butane-1,4-diol, and ethyl methyl ketone.

Curing can be carried out, depending on the nature of the curing agent, at room temperature (say, 18° to 25° C) or at higher temperatures (50° to 180° C, for example).

The new compositions may further contain suitable plasticizers such as dibutyl phthalate, dioctyl phthalate, and tricresyl phosphate, inert diluents such as tars and bitumen and so-called reactive diluents, especially monoepoxides such as n-butyl glycidyl ether, iso-octyl glycidyl ether, phenyl glycidyl ether, cresyl glycidyl ethers, glycidyl esters of tertiary, aliphatic, monocarboxylic acids, glycidyl acrylate, and glycidyl methacrylate. They may also contain additives such as fillers, reinforcing materials, coloring matter, flow control agents, flame inhibitors, and mould lubricants. Suitable extenders, fillers, and reinforcing materials are, for example, glass fibres, carbon fibres, ballotini, mica, quartz flour, calcium carbonate, cellulose, kaolin, wollastonite, colloidal silica having a large specific surface area, powdered poly(vinyl chloride), and powdered polyolefin hydrocarbons such as polyethylene and polypropylene.

The curable compositions of this invention may be used as laminating resins, paints and lacquers, sinter powders, impregnating and casting resins, moulding compositions, putties and sealing compounds, potting and insulating compounds for the electrical industry, and adhesives, and also in the manufacture of such products.

They may be supplied as a two-part pack, one part containing the epoxide resin and the other the polyamine curing agent, the accelerator being in either or both parts, but advantageously only with the curing agent part, because some epoxide resins tend to polymerise slowly, over a period of some months, when kept in contact with a salt of trifluoromethanesulphonic acid at room temperature.

The following Examples illustrate the invention. Temperatures are in degrees Celsius and, unless otherwise specified, parts are by weight. The accelerating effect is shown, as is conventional in this art, by the reduction in the time taken for the composition to gel, prior to curing; gelation times were determined by means of a "Techne" gelation timer, supplied by Techne (Cambridge) Limited, Duxford, Cambridge, England.

The salts were prepared by any of the following methods:

(a) The acid was mixed with 10 parts by volume of water and the ammonium, amine, or metal carbonate was added to bring the pH to 7. If the carbonate was insoluble in water, an excess over the theoretical amount was added and, when effervescence ceased, the excess was filtered off.

The resultant solution evaporated, and the salt was dried at 100°/13 mm Hg.

(b) The amine, ammonium, or metal nitrate was dissolved in ethanol and treated with an equivalent of the barium salt of the acid, also dissolved in ethanol. Barium nitrate precipitated from solution and was filtered off. The solution was evaporated and the product was dried as above.

(c) The amine, ammonium, or metal sulphate was dissolved in water and treated with an equivalent of the barium salt of the acid, dissolved in water. Barium sulphate precipitated and was filtered off. The solution was evaporated and the product was dried as above.

"Epoxide resin I" denotes a polyglycidyl ether of 2,2-bis(4-hydroxyphenyl)propane having a 1,2-epoxide content of 5.16 equivalents per kilogram and a viscosity at 21° of 245 poises.

"Epoxide resin II" denotes the diglycidyl ether of butane-1,4-diol.

"Epoxide resin III" denotes N,N'-diglycidyl-5,5-dimethylhydantoin.

"Epoxide resin IV" denotes N-glycidyl-N'-(2-glycidyloxypropyl)-5,5-dimethylhydantoin.

"Epoxide resin V" denotes the tetraglycidyl ether of pentaerythritol, advanced with 2,2-bis(4-hydroxyphenyl)propane to an epoxide content of 8.5 equiv./kg.

"Epoxide resin VI" denotes diglycidyl tetrahydrophthalate; its 1,2-epoxide content was 6.0 equiv./kg.

"Epoxide resin VII" denotes the tetrakis(N-glycidyl)-derivative of bis(4-aminophenyl)methane.

"Epoxide resin VIII" denotes 3,4-epoxycyclohexylmethyl 3',4'-epoxycyclohexanecarboxylate.

"Hardener I" denotes a commercially available liquid curing agent composed essentially of bis(4-aminophenyl)methane.

"Hardener II" denotes a 54% solution of bis(4-aminophenyl)methane in γ-butyrolactone.

"Hardener III" denotes bis(4-amino-3-methylcyclohexyl)methanane.

EXAMPLE 1

Epoxide resin I (50 g) was mixed at room temperature with Hardener I (16 g), and the gel time was recorded. Next, the experiment was repeated, incorporating in each case 0.5 g of a 50% solution of a trifluoromethanesulfonate in 2-methoxyethanol, and the corresponding gel times were recorded.

Table I shows the results obtained.

TABLE 1

| Salt | Gel Time (minutes) |
|---|---|
| none | 2682 |
| $Ba^{2+}$ | 1300 |
| $Cu^{2+}$ | 771 |
| $NH_4^+$ | 712 |
| $Li^+$ | 689 |
| $Zr^{4+}$ | 522 |
| $Cr^{3+}$; $Sn^{2+}$ | 378 ; 386 |
| $Ca^{2+}$ | 314 |
| $VO^{2+}$ | 303 |
| $Fe^{3+}$ | 155 |
| $Cd^{2+}$ | 31 |
| $Mn^{2+}$ | 31 |
| $Zn^{2+}$ | 18 |
| $Mg^{2+}$, $Ni^{2+}$ | 15 |
| $Co^{2+}$ | 6 |

EXAMPLE 2

The procedure of Example 1 was repeated, the accelerator being in each case 0.5 g of a 50% solution of magnesium trifluoromethanesulfonate. The solvents in which the magnesium salt were dissolved, and the corresponding gel times, are shown in Table II.

TABLE II

| Solvent | Gel time (minutes) |
|---|---|
| Ethyl methyl ketone | 32 |
| N-methylpyrrolidone | 119 |
| Di-n-butyl phthalate | 441 |
| Benzyl alcohol | 96 |
| Butane-1,4-diol | 64 |

EXAMPLE 3

Hardener I (22.8g) was mixed with 0.5 g of a 50% solution of magnesium trifluoromethanesulfonate in 2-methoxyethanol. After being left at room temperature for 30 days, during which time there was no noticeable change in its appearance, the mixture was combined with Epoxide resin II and the gel time at room temperature was noted. The experiment was repeated with other Epoxide resins, using the corresponding amount of Hardener I. The results are shown in Table III.

TABLE III

| Epoxide resin | Hardener I (g) | Gel time (minutes) |
|---|---|---|
| II | 22.8 | 14 |
| 70% III, 30% IV | 21 | 7 |
| V | 20 | 13.5 |
| VI | 19.6 | 12 |

EXAMPLE 4

Epoxide resin VII (50 g) was mixed at room temperature with Hardener II (38.5 g). The gel time at room temperature was 6159 minutes.

When 0.5 g of a 50% solution of magnesium trifluoromethanesulfonate in 2-methoxyethanol was also incorporated in the mixture the gel time at room temperature was 338 minutes.

EXAMPLE 5

Example 1 was repeated, Hardener I being replaced by 16 g of Hardener III. The accelerator was 0.5 g of a 50% solution of magnesium trifluoromethanesulfonate in 2-methoxyethanol. The gel time at room temperature in the absence of the accelerator was 428 minutes whereas when the accelerator was included the gel time was 134 minutes.

EXAMPLE 6

Epoxide resin VIII (50 g) and Hardener I (22 g) were mixed together at room temperature but did not harden, the viscosity increasing only slightly after 60,000 minutes.

When 0.5 g of a 50% solution of magnesium trifluoromethanesulfonate in 2-methoxyethanol was incorporated into a similar mixture which had been freshly prepared, the mixture gelled after 285 minutes.

EXAMPLE 7

A mixture comprising 87% of Epoxide resin I and 13% of iso-octyl glycidyl ether (50 g) was mixed at room temperature with Hardener I (16 g). The gel time at room temperature was 2507 minutes.

The experiment was repeated, using two conventional accelerators. When 2-methoxyethyl hydrogen maleate (0.5 g) was incorporated, the corresponding gel time was 379 minutes: when salicylic acid (0.5 g) was incorporated, the gel time at room temperature was 117 minutes.

Finally, the experiment was repeated with 0.5 g of a 50% solution of magnesium trifluoromethanesulfonate in 2-methoxyethanol incorporated. The gel time at room temperature was only 19 minutes.

I claim:
1. A composition comprising
   (i) an epoxide resin,
   (ii) from 0.75 to 1.25 amino hydrogen equivalents of an aromatic, heterocyclic, or cycloaliphatic polyamine per 1,2-epoxide equivalent of the epoxide resin (i), and
   (iii) a metal salt of trifluoromethanesulfonic acid, said metal selected from the group consisting of lithium, calcium, zinc, cadmium, cobalt, nickel, manganese, and magnesium.
2. The composition of claim 1, in which the salt (iii) is dissolved in an inert organic solvent.
3. The composition of claim 2, in which the said solvent is 2-methoxyethanol, ethylene glycol, diethylene glycol, N-methylpyrrolidone, γ-butyrolactone, benzyl alcohol, dibutyl phthalate, butane-1,4-diol, or ethyl methyl ketone.
4. The composition of claim 1, in which the polyamine (ii) is m- or p-phenylenediamine, bis(4-aminophenyl)methane, an aniline-formaldehyde resin, bis(4-aminophenyl) sulphone, m-xylylenediamine, bis(4-aminocyclohexyl)methane, 2,2-bis(4-aminocyclohexyl)propane, 2,2-bis(4-amino-3-methylcyclohexyl)propane, 3-amino-3,5,5-trimethylcyclohexylamine, N-(2-aminoethyl)piperazine, a polyaminoamide prepared from any of the foregoing polyamines and a dimerized or trimerized unsaturated fatty acid, or an adduct of any of the foregoing polyamines with a stoichiometric deficit of a polyepoxide.
5. The composition of claim 1, in which the epoxide resin (i) contains groups of the formula

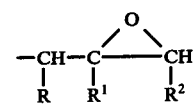

directly attached to atoms of oxygen, nitrogen, or sulfur, where either R and $R^2$ each represent a hydrogen atom, in which case $R^1$ denotes a hydrogen atom or a methyl group, or R and $R^2$ together represent —$CH_2CH_2$—, in which case $R^1$ denotes a hydrogen atom.
6. The composition of claim 5, in which the epoxide resin (i) is a polyglycidyl ester, a polyglycidyl ether, or an N,N'-diglycidylhydantoin.
7. The composition of claim 1, containing from 0.2 to 2 parts by weight of the salt (iii) per 100 parts of the combined weights of the epoxide resin (i) and the polyamine (ii).
8. A two part pack, the components of which, on mixing, form the composition of claim 1, one part containing the epoxide resin (i) and the other part the polyamine (ii), at least one part containing the salt (iii).
9. The product obtained by allowing or causing to cure the composition of claim 1.

* * * * *